(12) United States Patent
Kim (10) Patent No.: US 9,013,605 B2
(45) Date of Patent: Apr. 21, 2015

(54) APPARATUS AND METHOD FOR PROCESSING INTENSITY OF IMAGE IN DIGITAL CAMERA

(75) Inventor: Min-Seok Kim, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 365 days.

(21) Appl. No.: 13/458,159

(22) Filed: Apr. 27, 2012

(65) Prior Publication Data

US 2012/0274816 A1 Nov. 1, 2012

(30) Foreign Application Priority Data

Apr. 29, 2011 (KR) .................. 10-2011-0040808

(51) Int. Cl.
| | |
|---|---|
| *H04N 5/235* | (2006.01) |
| *H04N 1/407* | (2006.01) |
| *H04N 5/243* | (2006.01) |
| *H04N 5/355* | (2011.01) |

(52) U.S. Cl.
CPC ........... *H04N 5/2351* (2013.01); *H04N 1/4072* (2013.01); *H04N 5/243* (2013.01); *H04N 5/355* (2013.01)

(58) Field of Classification Search
USPC .................................................. 348/234, 242
See application file for complete search history.

(56) References Cited

U.S. PATENT DOCUMENTS

| | | | | |
|---|---|---|---|---|
| 2008/0043117 A1* | 2/2008 | Kim et al. | ............... | 348/224.1 |
| 2009/0010538 A1* | 1/2009 | Kim | ............... | 382/167 |
| 2009/0295930 A1* | 12/2009 | Deng | ............... | 348/208.99 |
| 2010/0097492 A1* | 4/2010 | Ha et al. | ............... | 348/229.1 |
| 2012/0114238 A1* | 5/2012 | Park | ............... | 382/169 |

FOREIGN PATENT DOCUMENTS

| | | |
|---|---|---|
| JP | 10-079885 | 3/1998 |
| KR | 1020070114556 | 12/2007 |
| KR | 1020080113950 | 12/2008 |

* cited by examiner

*Primary Examiner* — Gary C Vieaux
(74) *Attorney, Agent, or Firm* — IP & T Group LLP (57) ABSTRACT

An apparatus for processing an image in a digital camera includes an image signal collection unit configured to process an image collected from a lens into image information using a CMOS image sensor (CIS), and an image correction unit configured to compensate for an intensity in response to a compensation curve corresponding to the image information collected by the image signal collection unit and output an image signal compensated depending on the intensity.

14 Claims, 6 Drawing Sheets

INPUT IMAGE (701)

OUTPUT IMAGE (702)

FIG. 8

INPUT IMAGE (801)

OUTPUT IMAGE (802)

APPARATUS AND METHOD FOR PROCESSING INTENSITY OF IMAGE IN DIGITAL CAMERA

CROSS-REFERENCE TO RELATED APPLICATIONS

The present application claims priority of Korean Patent Application No. 10-2011-0040808, filed on Apr. 29, 2011, which is incorporated herein by reference in its entirety.

BACKGROUND

1. Field

Exemplary embodiments of the present invention relate to an apparatus and method for processing an image in a digital camera, and more particularly, to an apparatus and method for processing the intensity of an image taken by a digital camera.

2. Description of the Related Art

Digital cameras have been used in various fields, for example, general pictures and digital motion pictures. Digital cameras take images using photosensitive sensors made of a semiconductor material, and the photosensitive sensors are generally divided into two photosensitive sensors. The first sensor is a charge coupled device (CCD), and the second sensor is a CMOS image sensor or contact image sensor (CIS).

The two photosensitive sensors will be briefly described. A fabrication process of the CCD is more complicated than a fabrication process of the CIS, but the CCD has superior resolution to the CIS. Therefore, the CCD is more expensive than the CIS. However, digital cameras using the CCD are more frequently used to obtain high-quality images.

On the other hand, the digital cameras using the CIS achieve image quality compensation to a certain extent in a wide dynamic range.

Meanwhile, there is a Retinex technique that is a compensation technique for improving low luminance and image quality in the wide dynamic range.

In the Retinex technique, an image is compensated through a dynamic range compression process and a color restoration process. More specifically, in the Retinex technique, an image is compensated by modeling one image taken by a digital camera using scene (S), illumination (L), and reflectance (R). In the Retinex technique, a model of S=L*R is used. For reference, the scene can be captured by the digital camera, but the illumination and the reflectance cannot be directly measured by the digital camera. For this reason, in the Retinex technique, components L and R are extracted by performing a logarithmic operation on both sides of the model of S=L*R, and enhancement is performed on the extracted components L and R. By extracting and enhancing the components L and R, a wide dynamic range for improving low luminance may be achieved.

The related art uses a large quantity of hardware resources. A digital camera using the Retinex technique uses a low pass filter to obtain the illumination component, and many line memories are also used. In the Retinex technique, a line memory of 10 lines or more is used.

Additionally, in a digital camera using a technique other than the Retinex technique to improve the luminance of an image using the CIS, a bright area becomes brighter, and/or an original color is not maintained, and/or consecutive frames are not natural.

SUMMARY

An embodiment of the present invention is directed to an apparatus and method for increasing image quality in a digital camera that uses a CIS.

Another embodiment of the present invention is directed to an apparatus and method for improving the intensity of an area with low luminance in a digital camera that uses a CIS.

Still another embodiment of the present invention is directed to an apparatus and method for improving image quality in a digital camera that uses a CIS, and improving the image quality at a low cost.

In accordance with an embodiment of the present invention, an apparatus for processing an image in a digital camera includes an image signal collection unit configured to process an image collected from a lens into image information using a CMOS image sensor (CIS), and an image correction unit configured to compensate for an intensity in response to a compensation curve corresponding to the image information collected by the image signal collection unit and output an image signal compensated depending on the intensity.

In accordance with another embodiment of the present invention, a method for processing an image in a digital camera using a CIS includes extracting a mean value of an intensity of an image and applying a curve for compensating the intensity of the image when the mean value of the intensity of the image is smaller than a first value; and performing luminance compensation by applying a weight for luminance compensation to image information In accordance with another embodiment of the present invention, an apparatus for processing an image in a digital camera, includes an image signal collection unit configured to process an image collected from a lens and output the processed image as image information; and an image correction unit configured to compensate for an intensity of the image information in response to a compensation curve corresponding to the image information and output the compensated image information as an image signal.

DETAILED DESCRIPTION

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

In the present invention, performance similar to the Retinex technique can be obtained without using a line memory. More specifically, in an embodiment of the present invention, a memory is not used, and image quality can be improved by producing a compensation curve, multiplying an area with a low intensity by a high weight in the compensation curve, and multiplying an area with a high intensity by a weight almost close to 1.0 in the compensation curve.

Hereafter, these details will be described with reference to the accompanying drawings.

Figure 1:
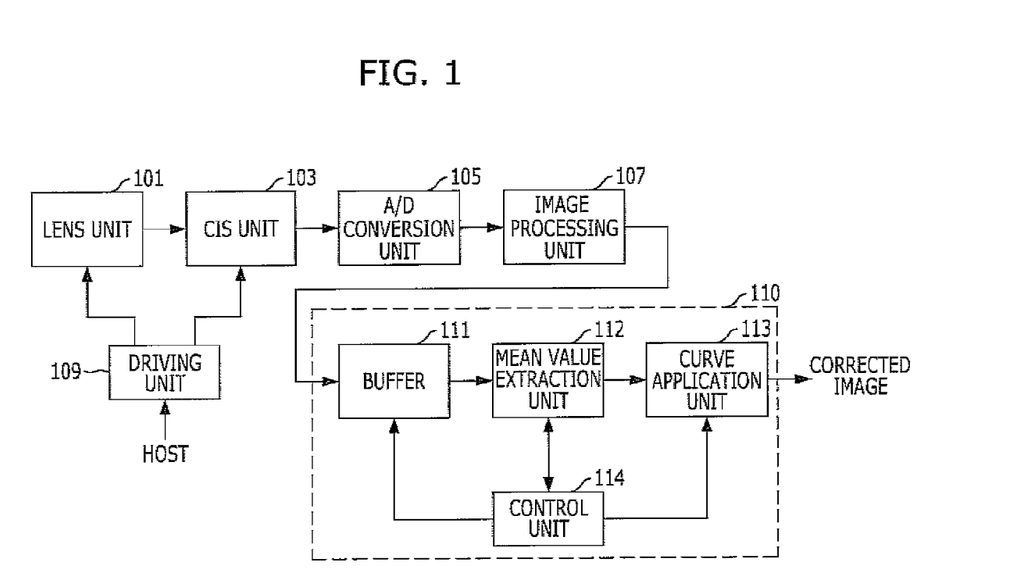
FIG. 1 is a block configuration diagram of an apparatus for compensating for an image photographed by a digital camera in accordance with an embodiment of the present invention.

FIG. 1 is a block configuration diagram of an apparatus for compensating for an image photographed by a digital camera in accordance with an embodiment of the present invention.

A lens unit 101 condenses light reflected from a subject and provides the condensed light to a CIS unit 103. The CIS unit 103 converts an optical signal condensed from the lens unit 101 into an electrical signal of an image and outputs the converted electrical signal. The lens unit 101 and the CIS unit 103 are driven by a driving signal provided from a driving unit 109. The driving unit 109 drives the lens unit 101 and the CIS unit 103 in response to a signal provided from a host or micro-processor. These details are generally well known in the art, and therefore, their detailed descriptions will be omitted.

The image converted into an electrical signal by the CIS unit 103 becomes an analog signal. The analog signal outputted from the CIS unit 103 is inputted to an A/D conversion unit 105. The A/D conversion unit 105 converts the inputted analog signal into a digital signal and outputs the converted digital signal. Subsequently, an image processing unit 107 converts the inputted digital signal into a still or moving image. The signal converted into the still or moving image is inputted to an image correction unit 110 in accordance with the present invention. In the following description, the configuration including the lens unit 101, the CIS unit 103, the A/D conversion unit 105, the image processing unit 107, and the driving unit 109 is referred to as an "image signal collection unit."

The image correction unit 110 includes a buffer 111, a mean value extraction unit 112, a curve application unit 113, and a control unit 114. Here, the buffer 111 may not be used when the data reception timing from the image processing unit 107 may be controlled. For illustration purposes, the buffer 111 is used.

The buffer 111 temporarily stores the image obtained from the image processing unit 107 and outputs the stored image. The mean value extraction unit 112 calculates a mean value of a luminous intensity of the image inputted from the buffer 111 and outputs the calculated mean value of the luminous intensity. The mean value of the luminous intensity of the image is used to adaptively compensate for low luminance depending on the intensity of an input image. Thus, the mean value of the luminous intensity of the image can be obtained by selecting one of the following three methods.

The first method is a method of extracting a mean value of a luminous intensity for the whole area of an input image. The second method is a method of extracting a mean value of a luminous intensity for a designated area of an input image. The third method is a method of extracting a code distribution for a specific intensity.

Each of the three methods will be described. The first method is the most frequently used method. The first method extracts a mean value of a luminous intensity for the whole area of still image and applies compensation depending on a difference between the intensity of each area of the image and the mean value of the luminous intensity.

The second method is a method created because most people take an image that focuses an important subject in the center of the image or a part of the center of the image. Accordingly, when the mean value of the luminous intensity of the taken image is calculated, the mean value of the luminous intensity for a specific interest area of the image is calculated, and the calculated mean value can be used as the total mean value of the luminous intensity. The area and size of the center may be set by an experiment or depending on the processing speed and load degree of the mean extraction unit for calculating a mean value of the luminous intensity.

Additionally, in the second method, areas of the image other than the center or part of the center may also be set as an interest area. More specifically, as occasion demands, various areas may be set as interest areas, e.g., a top-left part, a part of upper or lower 10% of the image, a bottom-right part, or the like.

In the third method, a general mean value of a luminous intensity is previously set for the purpose of intensity compensation, and whether the intensity at a specific position of an obtained image exists within a designated intensity range is determined. Subsequently, where the intensity of a specific position or area departs from the designated intensity range, the mean value of the intensity of the specific position or area is obtained.

Additionally, the present invention relates to low-luminance compensation. Accordingly, the third method will be described in a more detailed manner. In the third method, an area having a lower intensity than the designated intensity range is detected, and the mean value of the intensity for the detected area is extracted.

The image correction unit 110 in accordance with the present invention may use any one of the three methods described above. However, the first method will be mainly described for illustration purposes.

The mean value extraction unit 112 extracts a mean value of the intensity of the image using one of the three aforementioned methods and provides the extracted mean value of the intensity to the control unit 114. Subsequently, the control unit 114 selects an area of the image with low luminance using the mean value of the intensity of the image. This will be described in detail with reference to the following control flowchart and the curve application unit 113.

The curve application unit 113 selects one of a number of curve values and compensates for the intensity of the area with the low luminance under the control of the control unit 114. The curve application unit 113 may apply a curve that changes depending on a parameter provided from the control unit 114 to a pixel. More specifically, the curve application unit 113 has different curves that are suitable for a level for the intensity of the image, and the curve application unit 113 may change a curve by adding a weight to the curve depending on the parameter provided from the control unit 114. Accordingly, the intensity of the image can be compensated so that the intensity of the area with low luminance is sufficiently bright.

An example of the compensation curve applied in the curve application unit 113 will be described in a more detailed manner.

When the low-luminance compensation is performed on an area with low luminance in the image using the compensation curve, five different points may be used. The five different points are used to reduce hardware resources, and this embodiment using five different points will be described as an example. Since the present invention relates to low-luminance compensation, the low-luminance compensation will be described. Initial values for a curve applied to an image are represented by the following Expression 1.

x[0]=0.0 f y[0]=2.0 f x[1]=0.25 f y[1]=1.40478516 f x[2]=0.5 f y[2]=1.06689453 f x[3]=0.75 f y[3]=1.01416016 f x[4]=1.0 f y[4]=1.0 f     Expression 1

In Expression 1, the x-axis is represented by a ratio of intensity to input image. For example, when the value of the x-axis is 0, the intensity is 0. When the value of the x-axis is 0.25, the intensity is 64. When the value of the x-axis is 0.5, the intensity is 128. When the value of the x-axis is 0.75, the intensity is 196. When the value of the x-axis is 1.0, the intensity is 255. In Expression 1, the y-axis represents a weight to be used for compensation.

Figure 4:
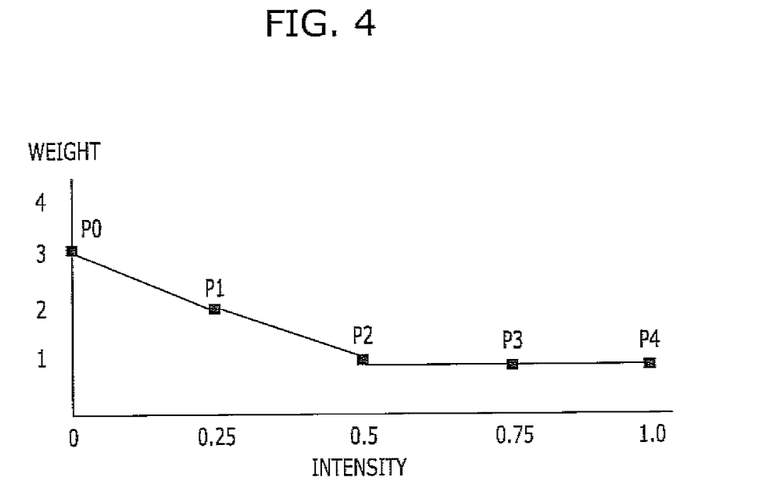
FIG. 4 is a graph illustrating a change in weight depending on a change in intensity in accordance with an embodiment of the present invention.

FIG. 4 is a graph illustrating a ratio of intensity to weight in accordance with an embodiment of the present invention.

The details described above will be again described with reference to FIG. 4. Ratios with respect to intensities are shown on the x-axis. More specifically, when the intensity is 0, the ratio becomes a point P0. When the intensity is 0.25, the ratio becomes a point P1. When the intensity is 0.5, the ratio becomes a point P2. When the intensity is 0.75, the ratio becomes a point P3. When the Intensity is 1.0, the ratio becomes a point P4. The weights corresponding to the respective points P0, P1, P2, P3 and P4 are defined by Expression 1.

The weights obtained as described above will be described in more detailed manner. As stated above, the present invention relates to low-luminance compensation. Accordingly, the basic concept of the compensation curve for low-luminance compensation is to multiply a pixel with a low intensity by a high weight and multiply a pixel with a high intensity by a low weight. Thus, a part of the image that has a high intensity and is not to be changed has a weight of 1.0.

The control unit 114 determines a parameter using information provided from the mean value extraction unit 112 and/or a designated intensity range. The parameter determined by the control unit 114 is provided to the curve application unit 113 and used to change the weight. This will be described in detail with reference to the following control flowchart.

Figure 2:
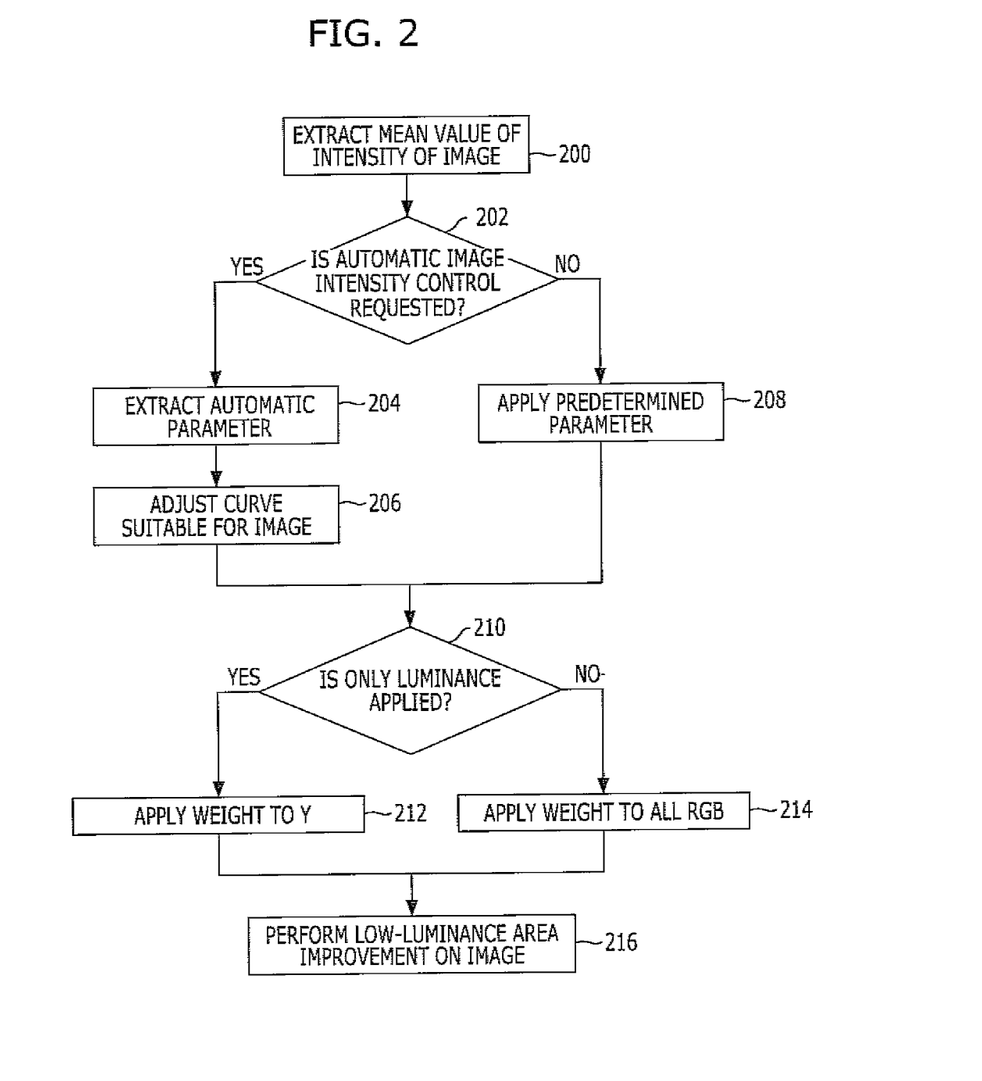
FIG. 2 is a control flowchart illustrating a method for improving low luminance in an image correction unit in accordance with the embodiment of the present invention.

FIG. 2 is a control flowchart illustrating a method for improving low luminance in an image correction unit 110 in accordance with the embodiment of the present invention.

An image received from the image processing unit 107 is inputted to the mean value extraction unit 112 through the buffer 111 or directly inputted to the mean value extraction unit 112. Subsequently, the mean value extraction unit 112 extracts a mean value of the intensity of the inputted image in step 200. The mean value of the intensity of the image may be a mean value of the intensity for the whole area of the image or a mean value of the intensity for a specific area of the image, as described above. In the third method, when the intensity of an inputted image is lower than a designated luminance range, the mean value for luminance of a corresponding part of the inputted image is outputted. In the third method, the mean value extraction unit 112 stores a designated luminance range received from the control unit 114 or directly stores the designated luminance without receiving the designated luminance from the control unit 114.

Next, the control unit 114 examines whether an automatic image intensity control is requested in step 202. Step 202 is a process of examining information, designated by a user, on whether to output the original image quality of an image or to control and output the intensity of the image. Accordingly, when the user sets the control unit 114 to perform the automatic image intensity control, the control unit 114 proceeds to step 204. Otherwise, the control unit 114 proceeds to step 208.

First, if the control unit 114 proceeds to the step 208, the control unit 114 applies a designated parameter to each pixel of the image and then proceeds to step 210. Alternatively, if the control unit 114 proceeds to the step 204, the control unit 114 extracts an automatic parameter for each pixel of the inputted image. Here, the automatic parameter becomes a parameter for compensating for the Intensity of the image. For example, the parameter applied by the control unit 114 is determined by comparing the mean value of the Intensity with a degree of the intensity of the current image, i.e., by comparing the mean value of the intensity with values designated as states of very low luminance, low luminance, normal luminance, high luminance and very high luminance. Subsequently, the control unit 114 provides the corresponding parameter to the curve application unit 113. Subsequently, the curve application unit 113 adjusts the curve depending on the parameter provided from the control unit 114 in the step 204.

Here, the application of an adaptive curve to an image will be described in a more detailed manner. In the present invention, the initial value of the compensation curve is determined as described above. However, since the intensity of an input image may change, adaptive processing on the low-luminance compensation may be performed. More specifically, a low weight is used in an image having no low luminance area, and a high weight is used in an image having many low luminance areas. In the curve application unit 113, an image is divided into three sections using parameters $T_{MIN}$ and $T_{MAX}$ to obtain an adaptive parameter. This will be described in detail later.

After step 206 or 208, the control unit 114 proceeds to the step 210. In the step 210, the control unit 114 examines whether to apply, for example, only luminance, i.e., brightness. Whether to apply, for example, only brightness may be set by a user or in the manufacturing process.

If, for example, only the luminance is applied as a result of step 210, the control unit 114 proceeds to step 212 and controls the curve application unit 113 so that the luminance is applied to value Y among values Y, Cb, and Cr. Alternatively, if the control unit 114 proceeds to step 214, the control unit 114 does not apply a weight to only the luminance but applies the weight to all components. Therefore, the control unit 114 controls the curve application unit 113 to apply a weight to all values R, G and B. Subsequently, the control unit 114 controls the image using the value applied in the step 212 or 214.

When a low luminance compensation module compensates for a low luminance area of the input image as illustrated in the step 212 or 214 of FIG. 2, a method of compensating for a luminance channel and a method of compensating for a color channels (RGB channel) are used. Where the luminance channel is compensated, a method of compensating, for example, only the component Y by changing an RGB color space into a YCbCr color space is used, which is the same as described in the step 212. In the method of compensating, for example, only the component Y, the amplification of a color component is not performed, and hence the occurrence of color noises may be reduced. In the method of compensating for the color channel (RGB channel), the color component is maintained when, for example, only the luminance component is compensated. The two methods are selectively used depending on characteristics of an image sensor.

If the control unit 114 proceeds to the step 216, the control unit 114 performs intensity improvement of an area with low luminance on the image having the weight applied thereto. The intensity improvement of the area with low luminance will be described in detail with reference to FIG. 3.

Figure 3:
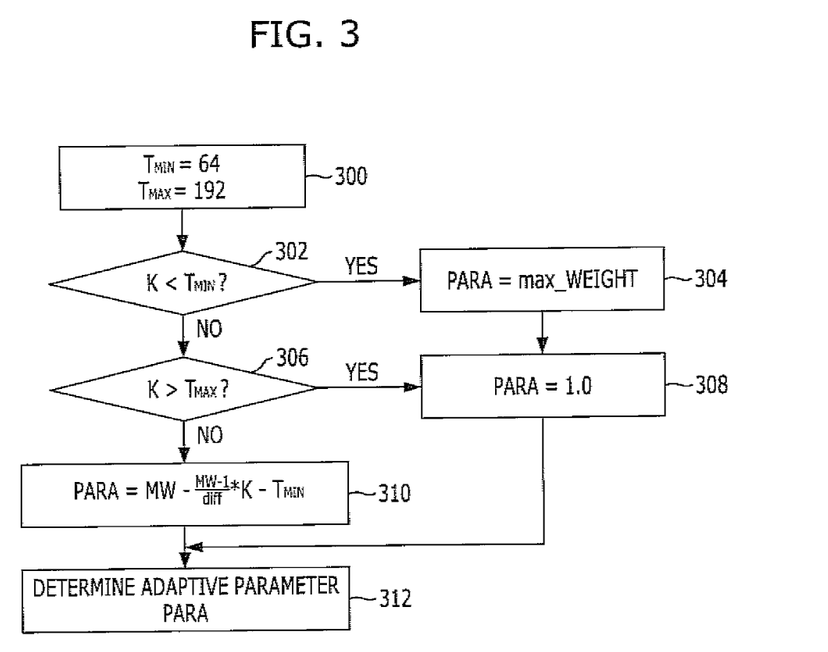
FIG. 3 is a control flowchart illustrating a method for applying a weight in accordance with the embodiment of the present invention.

FIG. 3 is a control flowchart illustrating a method for applying a weight in accordance with the embodiment of the present invention.

In step 300, an initial weight may have values represented by the following Expression 2. Initial weights $T_{MIN}$ and $T_{MAX}$ may be changed by a user as occasion demands.

$$T_{MIN} = 64$$

$$T_{MAX} = 192 \qquad \text{Expression 2}$$

When the initial weight is divided into $T_{MIN}$ and $T_{MAX}$ as described above, the intensity of an image is determined as three states. More specifically, the control unit 114 proceeds to step 302 and examines whether the intensity of a current pixel K is smaller than $T_{MIN}$. If the intensity of the current pixel K is smaller than $T_{MIN}$, the control unit 114 proceeds to step 304. In step 304, the control unit 114 sets a parameter PARA to be applied as a maximum weight max_WEIGHT. Subsequently, the control unit 114 proceeds to step 308 and sets the parameter as 1.0, and the control unit 114 proceeds to step 312.

If the intensity of the current pixel K is not smaller than $T_{MIN}$, the control unit 114 proceeds to step 306 and examines whether the intensity of the current pixel K is greater than $T_{MAX}$. If the intensity of the current pixel K is greater than $T_{MAX}$, the control unit 114 proceeds to the step 308 and sets the parameter PARA as 1.0, and the control unit 114 proceeds to the step 312.

If the intensity of the current pixel K is not greater than $T_{MAX}$, the control unit 114 proceeds to step 310 and sets the parameter as represented by the following Expression 3.

$$PARA = MW - \frac{MW - 1}{diff} * K - T_{MIN} \qquad \text{Expression 3}$$

In Expression 3, MW denotes a maximum weight, and diff denotes a difference between $T_{MIN}$ and $T_{MAX}$.

Subsequently, the control unit 114 proceeds to the step 312 and determines PARA an adaptive parameter of the image.

In the control flowchart of FIG. 3 described above, the intensity of the image is divided into three states. More specifically, the intensity of the image may be divided as follows.

1. A state where the intensity mean of the image is very low
2. A state where the intensity mean of the image is normal
3. A state where the intensity mean of the image is very high In state 1, the input image generally has a low intensity, and hence the control unit 114 applies the maximum weight max_WEIGHT, which is $T_{MAX}$. In state 2, the control unit 114 applies the maximum weight max_WEIGHT in proportion to the intensity of the input image. In state 3, the input image generally has a high intensity, and hence the control unit 114 applies 1.0, which is $T_{MIN}$.

Figure 5:
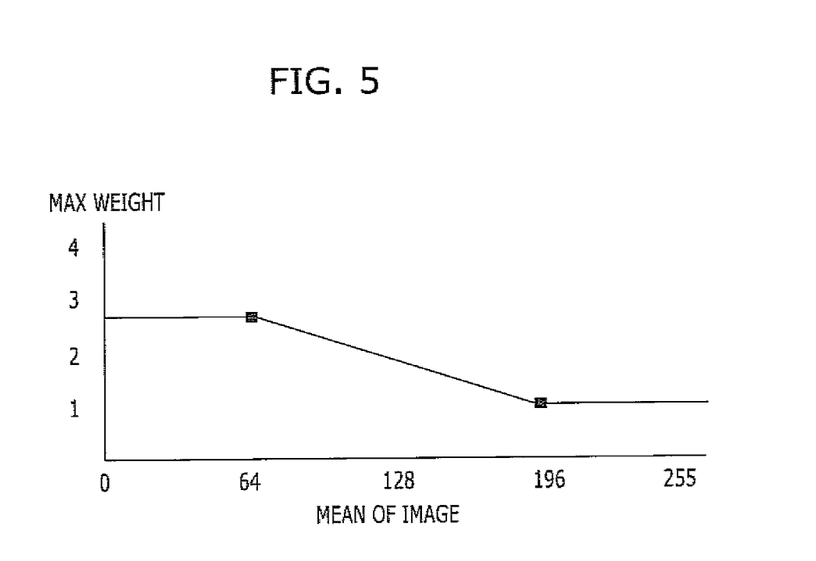
FIG. 5 is a graph illustrating a relationship between a mean of Images and a maximum weight.
Figure 6:
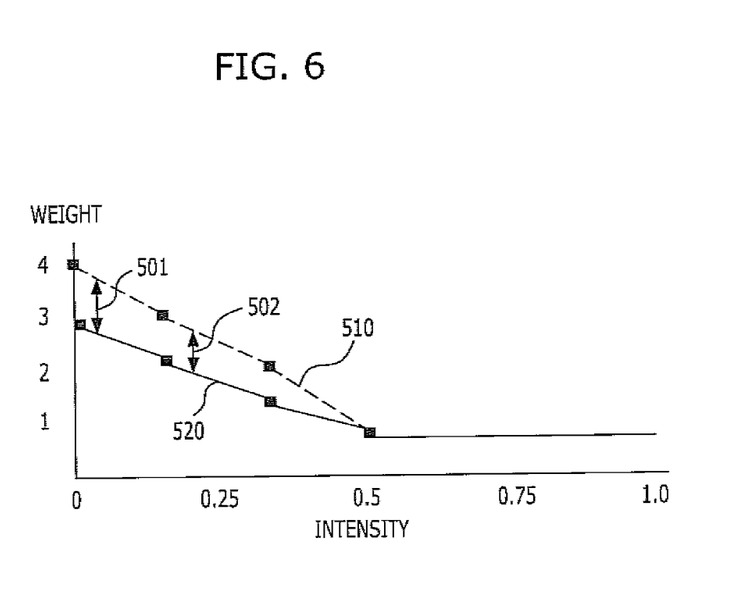
FIG. 6 is a graph illustrating a change in weight depending on a change in intensity in accordance with the embodiment of the present invention.

FIG. 4 illustrates a compensation curve initially determined, and a compensation curve adaptive to an image with low intensity, as illustrated in FIG. 6, is generated by applying the adaptive parameter to the intensity of the image extracted in the module. Also, FIG. 5 is a graph illustrating a relationship between a mean of images and a maximum weight. The compensation method will be described with reference to the compensation curve of FIG. 4. If the intensity of an input pixel exists between the points P1 and P2, the intensity of the input pixel is multiplied by a corresponding weight using the equation of a straight line passing through the points P1 and P2. If the Intensity of the input pixel exists between the points P2 and P3, the intensity of the input pixel is multiplied by a corresponding weight. The points P3 and P4 are processed using the method described above. If the intensity of the input pixel has a value higher than the point P4, the intensity of the input pixel is maintained as it is by multiplying the intensity of the input pixel by a weight of 1.0.

Figure 7:
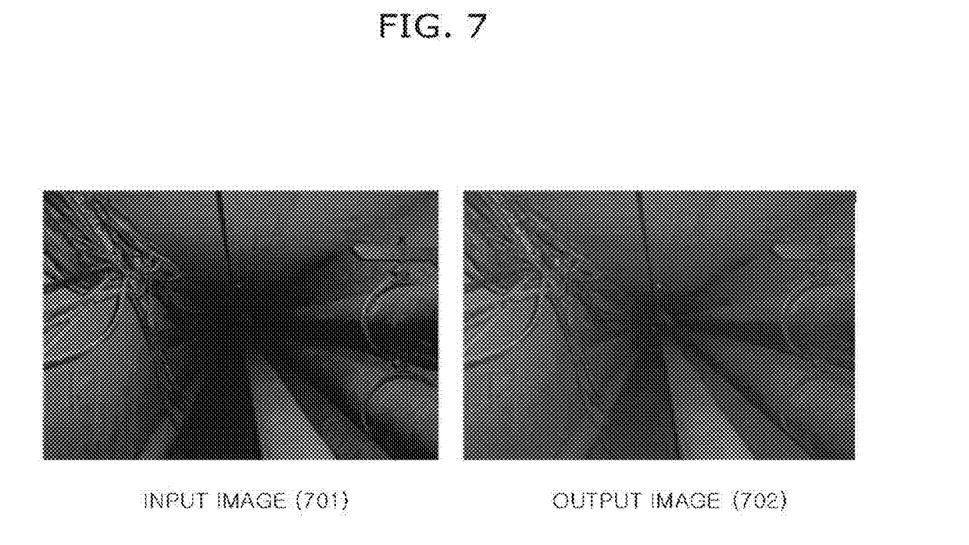
FIG. 7 illustrates an image where intensity correction is applied to an input image.
Figure 8:
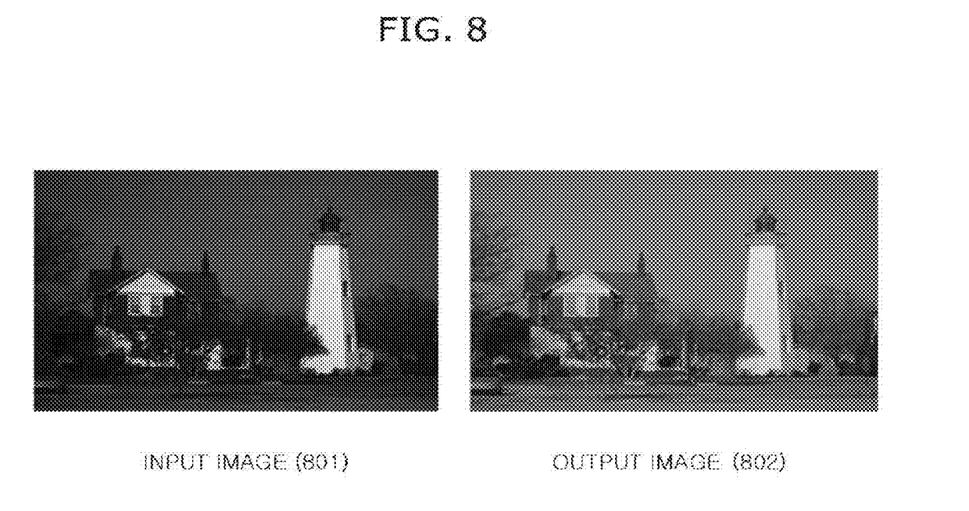
FIG. 8 illustrates an image where intensity correction is applied to an input image.

FIGS. 7 and 8 illustrate test results obtained by performing experiments. In FIGS. 7 and 8, images to be tested are divided into input images 701 and 801 and output images 702 and 802, respectively. First, the input image 701 of FIG. 7 will be described. In the input image 701 of FIG. 7, an area with a low intensity exists at a center of the input image 701, and an area with a relatively high intensity exists at an edge of the input image 701. As shown in the output image 702, the resolution of the area with the low intensity is increased by brightening only the dark area at the center of the input image 701 while maintaining the intensity of the area at the edge of the input image 701.

Next, the input image 801 of FIG. 8 will be described. The Input image is an image having many areas with low intensities throughout the image. As shown in the output image 802, the resolution of the image is increased by compensating for the intensities of the areas with low intensities while maintaining a high intensity of the tower.

As described above, the quality of an image can be improved by using the apparatus and method in accordance with the present invention. Further, the present invention uses a technique that compensates for the area with low intensity while maintaining an area with high intensity. Furthermore, the technique can be implemented as hardware without using a memory, unlike other algorithms.

While the present invention has been described with respect to the specific embodiments, it will be apparent to those skilled in the art that various changes and modifications may be made without departing from the spirit and scope of the invention as defined in the following claims.

What is claimed is:

1. An apparatus for processing an image in a digital camera, comprising:
an image signal collection unit configured to process an image collected from a lens into image information using a CMOS image sensor (CIS)
an image correction unit configured to compensate for an intensity in response to a compensation curve corresponding to the image info cation collected by the image signal collection unit and output an image signal compensated depending on the intensity; and
a control unit configured to determine a curve for luminance compensation when a mean value of the intensity is lower than a first intensity,
wherein the control unit applies a weight having a curve for color correction when the image correction unit performs color correction together with the luminance compensation on an area where the mean value of the intensity is smaller than the first intensity value.

2. The apparatus of claim 1, wherein the image correction unit comprises:
a mean extraction unit configured to extract the mean value of an intensity of the image information collected by the image signal collection unit;

a curve application unit configured to apply the curve for luminance compensation to the image information.

3. The apparatus of claim 1, wherein the image signal collection unit comprises:
the CIS configured to convert the image collected from the lens into analog image information;
an analog/digital conversion unit configured to convert the analog image information into digital image information; and
an image processing unit configured to convert and process the digital image information into the image information.

4. A method for processing an image in a digital camera using a CMOS image sensor (CIS), comprising:
extracting a mean value of an intensity of an image and applying a curve for compensating the intensity of the image when the mean value of the intensity of the image is smaller than a first value;
performing luminance compensation by applying a weight for luminance compensation to image information; and
comprising applying a weight having a curve for the color compensation when the image correction unit performs color correction together with the luminance compensation on an area where the mean value of the intensity is smaller than the first intensity value.

5. The method of claim 4, further comprising adding the weight to an RGB value for color correction when color information is determined to be corrected in addition to the luminance compensation.

6. An apparatus for processing an image in a digital camera, comprising:
an image signal collection unit configured to process an image collected from a lens and output the processed image as image information;
an image correction unit configured to compensate for an intensity of the image information in response to a compensation curve corresponding to the image information and output the compensated image information as an image signal; and
a control unit configured to determine the compensation curve in response to the comparison result between a mean value and a first intensity value,
wherein the control unit is configured to determine the compensation curve indicating that an intensity of the image information is inversely proportional to a weight applied to the image information.

7. The apparatus of claim 6, wherein the image signal collection unit comprises:
a CMOS image sensor (CIS) configured to convert the image collected from the lens into analog image information;
an analog/digital conversion unit configured to convert the analog image information into digital image information; and
an image processing unit configured to convert and process the digital image information into the image information.

8. The apparatus of claim 6, wherein,
the control unit is configured to determine the compensation curve indicating a maximum weight applied to the image information when the image correction unit determines that the extracted mean value is smaller than a first minimum intensity value.

9. The apparatus of claim 8, wherein,
the control unit is configured to determine the compensation curve indicating a fixed weight applied to the image information, the fixed weight being smaller than the maximum weight, when the image correction unit determines that the extracted mean value is greater than a first maximum intensity value.

10. The apparatus of claim 9, wherein,
the control unit is configured to determine the compensation curve indicating a weight proportional between the fixed weight and the maximum weight when the image correction unit determines that the extracted mean value has a value between the minimum intensity value and the maximum intensity value.

11. The apparatus of claim 6, wherein the image correction unit comprises:
a mean value extraction unit configured to extract the mean value of the intensity of the image information;
a curve application unit configured to apply the compensation curve to the image information.

12. The apparatus of claim 11, wherein the mean value extraction unit is configured to extract the mean value of the intensity of the whole area of an image represented by the image information.

13. The apparatus of claim 11, wherein the mean value extraction unit is configured to extract the mean value of the intensity of a first area of the image information.

14. The apparatus of claim 13, wherein the first area includes a center area of the image information.

* * * * *